United States Patent
Schroeder et al.

(10) Patent No.: US 10,234,350 B1
(45) Date of Patent: Mar. 19, 2019

(54) APPLIANCE HOSE BALLOONING/FAILURE DETECTOR LOOP

(71) Applicant: UIPCO, LLC, San Antonio, TX (US)

(72) Inventors: Eric David Schroeder, San Antonio, TX (US); Carlos J. P. Chavez, San Antonio, TX (US); Manfred Amann, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

(21) Appl. No.: 15/786,056

(22) Filed: Oct. 17, 2017

Related U.S. Application Data

(60) Provisional application No. 62/409,482, filed on Oct. 18, 2016.

(51) Int. Cl.
| G08B 21/00 | (2006.01) |
| G01L 9/00 | (2006.01) |
| F16K 31/06 | (2006.01) |
| F16L 11/12 | (2006.01) |
| E03C 1/02 | (2006.01) |

(52) U.S. Cl.
CPC ............ *G01L 9/0027* (2013.01); *F16K 31/06* (2013.01); *F16L 11/12* (2013.01); *E03C 1/025* (2013.01)

(58) Field of Classification Search
CPC ........ G01L 9/0027; F16K 31/06; F16L 11/12; E03C 1/025
USPC ....................................................... 340/603
See application file for complete search history.

(56) References Cited

U.S. PATENT DOCUMENTS

| 5,048,174 A * | 9/1991 | McGuire | F16L 55/1652 138/97 |
| 5,969,618 A * | 10/1999 | Redmond | G01M 3/18 174/11 R |
| 6,147,613 A * | 11/2000 | Doumit | G01M 3/04 137/312 |
| 6,265,880 B1 * | 7/2001 | Born | G01R 27/08 324/525 |
| 6,314,795 B1 * | 11/2001 | Ingham | G01M 3/2823 73/40.5 R |
| 6,936,798 B2 * | 8/2005 | Moreno | F24H 9/2021 219/481 |
| 9,734,679 B2 * | 8/2017 | Heinz | G08B 13/12 |
| 2004/0065377 A1 * | 4/2004 | Whiteley | F16L 11/127 138/104 |
| 2004/0098212 A1 * | 5/2004 | Hong | G01M 3/165 702/51 |
| 2005/0255724 A1 * | 11/2005 | Picco | H01R 13/6683 439/77 |
| 2009/0066524 A1 * | 3/2009 | Yukawa | G01M 3/2815 340/605 |
| 2009/0277252 A1 * | 11/2009 | Shin | G01M 3/18 73/49.1 |
| 2010/0024541 A1 * | 2/2010 | Schindler | G01M 3/26 73/199 |

(Continued)

*Primary Examiner* — Kerri L McNally
*Assistant Examiner* — Thang D Tran
(74) *Attorney, Agent, or Firm* — Joseph A. Fuchs; Greensfelder, Hemker & Gale, P.C.

(57) ABSTRACT

The present invention provides a system for detecting an imminent failure or an existing failure in a water supply hose to an appliance and reporting the changed condition of the hose to a designated person at a designated address.

19 Claims, 1 Drawing Sheet

(56) References Cited

U.S. PATENT DOCUMENTS

| | | | |
|---|---|---|---|
| 2012/0278018 A1* | 11/2012 | Hastreiter | G01M 3/18 |
| | | | 702/65 |
| 2013/0036796 A1* | 2/2013 | Fleury, Jr. | G01M 3/00 |
| | | | 73/40.5 R |
| 2013/0080081 A1* | 3/2013 | Dugger | G01F 1/667 |
| | | | 702/48 |
| 2014/0130577 A1* | 5/2014 | Chatzigeorgiou | G01M 3/18 |
| | | | 73/49.1 |
| 2015/0159351 A1* | 6/2015 | Smith | E03C 1/025 |
| | | | 251/129.11 |
| 2015/0181652 A1* | 6/2015 | Lollar | H05B 3/56 |
| | | | 219/541 |
| 2015/0247584 A1* | 9/2015 | Singley | D06F 39/081 |
| | | | 251/69 |
| 2015/0348395 A1* | 12/2015 | Trout | G08B 21/20 |
| | | | 340/605 |
| 2016/0002842 A1* | 1/2016 | Dawes | G05D 9/12 |
| | | | 137/398 |
| 2016/0061640 A1* | 3/2016 | Joshi | G01F 1/00 |
| | | | 73/197 |
| 2016/0076909 A1* | 3/2016 | Klicpera | G06Q 50/06 |
| | | | 73/198 |
| 2016/0284193 A1* | 9/2016 | Davis | G01M 3/16 |
| 2016/0335875 A1* | 11/2016 | Alcorn | G01F 1/34 |
| 2017/0199064 A1* | 7/2017 | Lozano | G01M 1/00 |
| 2017/0234759 A1* | 8/2017 | Youcef-Toumi | G01M 3/2823 |
| | | | 73/40.5 R |
| 2017/0234921 A1* | 8/2017 | Handy | G01R 31/085 |
| | | | 324/533 |

\* cited by examiner

APPLIANCE HOSE BALLOONING/FAILURE DETECTOR LOOP

CROSS-REFERENCE TO RELATED APPLICATIONS

The present application claims the benefit of U.S. Provisional Patent Application Ser. No. 62/409,482 filed Oct. 18, 2016 which is incorporated herein by reference.

FEDERALLY SPONSORED RESEARCH OR DEVELOPMENT

N/A

FIELD OF THE INVENTION

The present invention provides a device for detecting and reporting a change in a condition of a water supply hose from a supply of water to an appliance to indicate the hose is in a condition of imminent failure, and needs to be replaced, or in a condition of failure with a water leak.

DESCRIPTION OF THE PRIOR ART

Insurance companies pay out billions of dollars each year for loss due to water damage. Over 31% of those claims are due to leaks from washing machines and dishwashers. Approximately ⅔rds of such appliance leak claims are due to a failure in the water-supply line, pipe, or hose with an average payout of about $11,000. According to State Farm data, when an appliance supply hose at 70 psi ruptures, it is capable of delivering 650 gallons per hour of water. If a homeowner is away when such a leak happens, even 30 minutes will cause catastrophic damage resulting in thousands of dollars in damage. By notifying the homeowner when their appliance hoses are failing, we can prevent thousands of claims a year resulting in a savings in millions of dollars in claims.

Thus, there is a need for a device to warn an owner or operator of these appliances of an imminent leak or of an existing leak in the hose so the owner or operator can attend to a failing hose or an existing leak. Additionally, the device can be electronically coupled to a water supply line of the hose to automatically shut off a water supply to the hose upon detection of a failing hose or a leaking hose.

SUMMARY OF THE INVENTION

The present invention provides a system for detecting an imminent failure or an existing failure in a water supply hose to an appliance and reporting the changed condition of the hose to a designated person at a designated address.

BRIEF DESCRIPTION OF THE DRAWINGS

To understand the present invention, it will now be described by way of example, with reference to the accompanying drawings and attachments in which.

DETAILED DESCRIPTION

Figure 1:
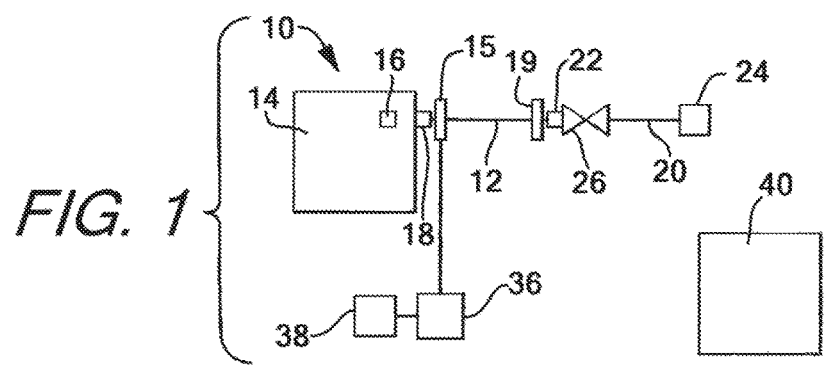
FIG. 1 is a schematic view of a water detection and alerting system.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

FIG. 1 shows a system and device 10 for detecting an imminent failure or an existing failure in a water supply hose 12 to an appliance 14 using a detector 15. A water supply hose for an appliance typically are made of rubber and have a first coupling element 18 for connecting to the appliance. Preferably the first coupling element 18 will be made of metal and have a connecting element such as threads to mate with threads on the appliance. Other connecting elements could be used such as an interference fit, for example. Further, it is contemplated other materials could be used in lieu of metal such as polymeric material. Some appliance hoses also have a second coupling element 22 like the first at an opposed end to attach the hose to a water supply source 24 to place the appliance in fluid communication with the water supply line 20. A valve 26 represents the main water shutoff valve to a facility where the appliance 14 is housed. This valve 26 can be moved to a closed position, in certain exemplary embodiments, automatically upon receiving a signal from a hub 40 of the detection of a leak or an imminent leak, to prevent or minimize water damage.

One or more detectors 15 can be used per appliance water supply hose 12, and preferably, if using a single detector 15 it is placed proximate the first coupling 18 or proximate the second coupling 22. If two detectors 15 are used, one of each will be placed proximate one of each of the first coupling 18 and the second coupling 19. Additional detectors can be used along the hose without departing from the present invention.

In one exemplary system, a central control unit 36 has a BLE chip, or other chip for near field communication, with an integrated microcontroller to monitor the continuity of the wire 34. The control unit 36 will be under continuous low-power state monitoring the resistance across the wire 34. When a significant change in resistance is detected, the BLE chip would then wake and send an alert to a monitoring hub 40. The homeowner/user would then be notified via push or other system that their appliance water supply hose condition has been compromised and needs to be replaced.

A hose is compromised if the sidewall breaks open or if it has been permanently deformed to have a diameter significantly different from the original diameter. The term "permanent" is meant to be a period of time greater than a pressure cycle of the hose—the period of time between the opening of the solenoid valve 16 and the hose reaching a maximum pressure. Thus, a hose may be considered to be permanently deformed if it retains a different diameter for a period of say 10 seconds to say five minutes or more. A change in diameter is considered to be "significant" if it differs by more than 1% to 20%, or any range or combination of ranges therein from the original diameter.

Appliances that utilize water typically have such a solenoid valve 16 that opens to allow water flow into the appliance and closes to stop the flow. The opening of the valve and the closing of the valve constitutes two pressure cycles. When the solenoid valve 16 opens, the hose 12 experiences a sudden change (decrease) in pressure applying a radially inwardly directed force to the sidewall of the hose. The decrease in pressure can cause the sidewall of the hose to move axially inwardly into a partially collapsed condition or a fully collapsed condition. When the solenoid valve 16 shuts there is a sudden spike (increase) in pressure in the hose applying radially outwardly directed force to the sidewalls of the hose. The increase in pressure can lead to an increase in diameter of the hose sidewall and can result in creating a bubble or ballooning of the hose. The changes in diameter of the hose can break the wire 34 leading to the control unit 36, sending through the hub 40, a notice to a person who has been designated to receive such notices of a water leak.

One failure mode for the hose results from repeated uses of the appliance and the concomitant pressure cycles. Over time, the cyclic and sudden changes in the hose pressure combined with the substantial difference in the elastic modulus between the rubber of the hose sidewall and the metal coupling 18, causes the hose to balloon around the coupling or couplings. As the rubber balloons around the metal coupling, a phenomenon called razoring occurs (where metal edges of the coupling slice through the ballooning rubber). This is the principal failure mode of appliance water supply hoses. The addition of a stainless steel braid around the rubber helps to some degree to reduce the amount of ballooning, but they are still subject to failure via the same mode. Once the internal rubber hose is cut, the porous stainless steel braid serves no purpose to hold back the leaking water.

In another embodiment, the detector 15 is capable of detecting permanent changes in the diameter of the hose for a significant period of time that do not result in the rupture of the sidewall of the hose. Such changes in the diameter of the hose indicate an imminent rupture. Upon detection of an imminent rupture, the control unit 36 sends a message through the hub 40 to the designated person of the imminent failure of the hose.

The hub 40 is implemented through software and hardware, such as a computer. The software will preferably, but not necessarily, have a graphical user interface (GUI) for an owner/installer to program the system. The GUI will allow for an owner/installer to enter a designated person or persons to receive a message of a leak or imminent leak and the address or addresses of such person or persons. The message can be sent in any suitable electronic form including email and text messages for example. The message can be sent through an electronic network such as the Internet. The GUI also allows an owner/installer to specify the text of the message to provide information such as the location of the leak or imminent leak or the specific device that signaled a leak or imminent leak. The GUI will also allow the owner/installer to specify other locations in the Internet of Things to send an electronic signal representative of the leak to shut the water supply valve 26 or to activate another device. The hub can also trigger an alarm that provides a visual or aural indication of a change in the condition of the hose to a designated location or device.

Figure 2:
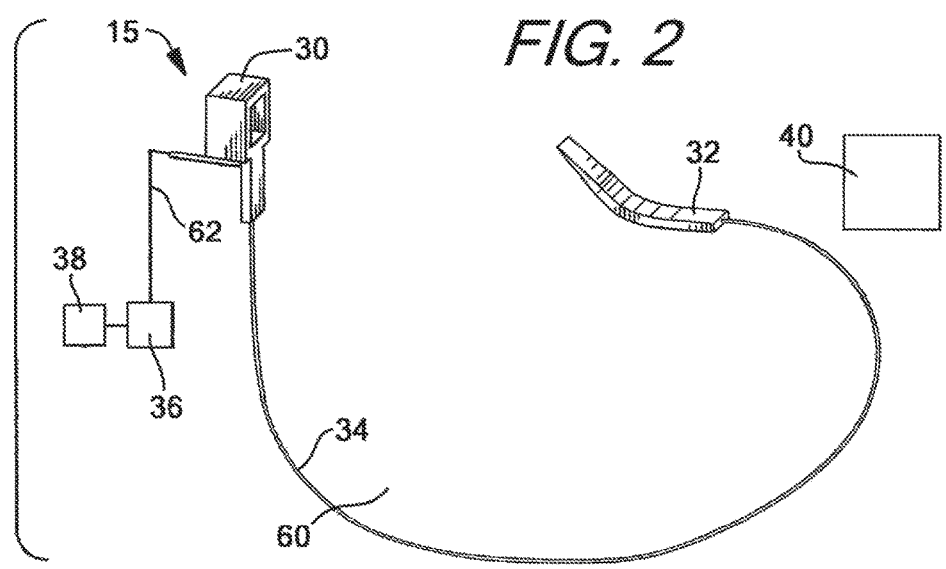
FIG. 2 is a schematic representation of the water detection and alerting system.

FIG. 2 shows the detector 15 has a head end 30 and a tail end 32 and a wire 34 connecting the two ends. The wire 34 is wrapped about the appliance water supply hose near the coupling in close or snug contact with an outer surface of the hose sidewall. The tail end 32 of the wire is inserted into the head to place the opposed ends into electrical contact. The wire 34 is connected to a central control unit 36 and a power source 38.

Figure 3:
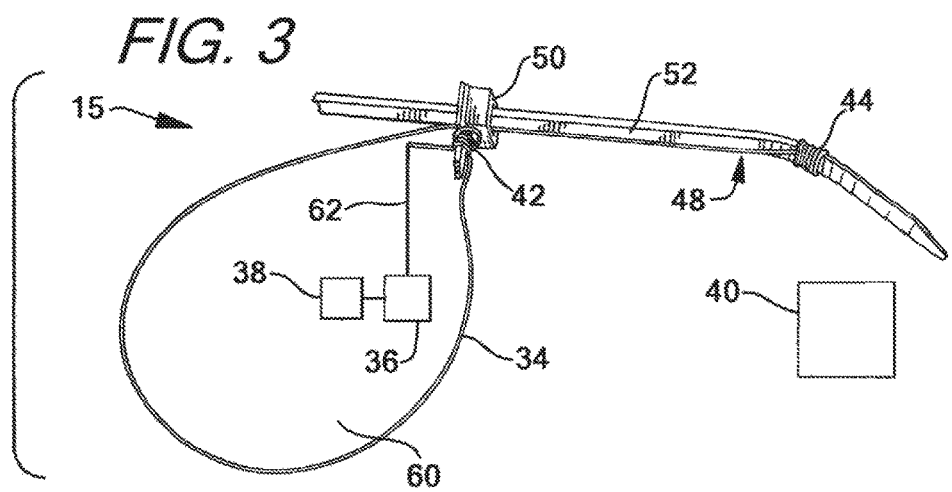
FIG. 3 is a schematic representation of an alternative embodiment of the water detection system.

FIG. 3 shows another exemplary embodiment of the detector 15 using a cable tie 48. The cable tie 48 has a flexible tape section 52 with teeth that engage with a pawl in the head 50 to form a ratchet. The ratchet only allows the tape to move in a single direction through the head to tighten the cable tie. Typically, once tightened to a point, the cable tie can only be further tightened up to a maximum position and cannot be loosened by moving the tape in the opposite direction. However, there are cable ties available that have a release buttons so the cable tie can be undone for reuse. The cable tie shown in FIG. 3 is a prototype tie that has been cut to separate the tape section 52 from the head 50. The wire has a first end portion 42 attached to the head 50 of the cable tie and an opposed second end portion 44 connected to an intermediate portion of the tape section 52.

Now to describe how to use the system 10. We will describe the use of the invention with a single detector 15 of the cable-tie embodiment shown in FIG. 3 mounted to the hose 12 proximate coupling 18 as shown in FIG. 1. The use of different embodiments of the detector 15 or a different number of detectors will be clear from this description. Software accompanying the detector is installed on a computer and a user or installer enters the contact information for the person or persons to be contacted as well as the text of the message to send. The tape of the cable tie and the wire are placed in surface contact with an outer surface of the hose. The tail or second end portion 44 of the cable tie is bent to form a loop 60 (FIGS. 2 and 3) encompassing the hose. The owner/installer threads the second end portion through the ratchet in the head and is pulled through to tighten the loop 60 to bring the wire 34 into snug engagement with the outer surface of the hose sidewall. The control unit 36 and power source 38 are placed in a suitable location and preferably the control unit is connected by a wire 62 to the wire 34. A test can be run to ensure continuity of the circuit, to send a test message to report of a leak or imminent leak, and other tests to ensure the system is in an activated condition capable of detecting a leak or an imminent leak.

The present invention also provides a method for detecting an imminent failure or an existing failure in a water supply hose to an appliance, the hose having a sidewall with an exterior surface, an internal lumen and a first coupler at one end connected to an intake of the appliance and a second coupler at an opposed end connected to a water supply valve. The method requires: (1) wrapping a first conductive material about a portion of the hose proximate the first coupling or the second coupling; (2) establishing an electrical current through the first conductive material; (3) connecting the first conductive material to a first hub; (4) detecting changes in the diameter or shape of the hose with the first conductive material and the first hub; (5) comparing the changes in the diameter or shape of the hose with a threshold value; and (6) transmitting an electronic signal with the hub to notify of a leak or an imminent leak in response to exceeding the threshold value. The first hub is in electrical communication with the water supply valve, and the first hub is capable of generating and transmitting a signal to a control associated with the water supply valve to move the valve to a shut condition. The hub transmits an electronic signal to report of a leak when current flow is lost through the conductive material. The method further includes the step of entering into the hub an electronic address to transmit the electronic signal to notify of a leak or an imminent leak. The hub can also provide a visual or aural indication to notify of a leak or an imminent leak. The method further allows for a user or operator of the hub to enter a textual message into the hub to be sent with the electronic signal. The method further includes the step of wrapping a second conducting material about the hose and spaced from the first conducting material and connecting it to a second hub. Preferably, the first conducting material is positioned proximate the first coupler and the second conducting material positioned proximate the second coupler. As set forth above, the first hub or the second hub will utilize a BLE chip.

Many modifications and variations of the present invention are possible in light of the above teachings. It is, therefore, to be understood within the scope of the appended claims the invention may be protected otherwise than as specifically described.

We claim:

1. A system for detecting an imminent failure or an existing failure in a rubber water supply hose to an appliance, the hose having a sidewall with an exterior surface, an internal lumen and a first coupler at one end connected to an intake of the appliance to place the appliance in fluid communication with the water supply, the system comprising: a wire having opposed ends has a portion in close contact with the outer surface proximal the coupling, the wire forming a part of a circuit for conducting electricity when the circuit has continuity and does not conduct electricity when the circuit does not have continuity; a control unit connected to opposed end portions of the wire to determine whether the circuit has continuity and generating and transmitting a signal representative of a loss of continuity to a hub and to measure at a first moment in time an original diameter of the hose and after a pressure cycle of the hose has occurred after the first moment measuring the diameter of the hose at a second moment to define a current diameter and if the difference between the original diameter and the current diameter exceed a threshold value generating a signal to the hub of an imminent failure in the hose; and the hub has a receiver for receiving the signal from the control unit and generating and transmitting a signal representative of a loss of continuity or an imminent failure in the hose to a designated person at a designated address through the Internet.

2. The system of claim 1 wherein the control unit applies a current to the circuit to maintain a low-power state.

3. The system of claim 2 wherein the control unit measures a resistance across the circuit.

4. The system of claim 1 wherein the hub is in electrical communication with a water supply valve positioned between the water supply and the appliance and for shutting off water to the appliance when in a shut condition, and the hub is generating and transmitting a signal to a control associated with the valve to move the valve to a shut condition.

5. The system of claim 1 further comprising a cable tie having a head at one end, a tail at the opposed end, and a tape section connecting the opposed ends, one end of the wire is connected to the head and an opposed end of the wire is connected to an intermediate portion of the cable tie.

6. The system of claim 5 wherein the head contains a pawl and the tape has a plurality of spaced teeth to form a ratchet.

7. The system of claim 1 further comprising a second coupler on an opposed end of the hose from the first coupler.

8. The system of claim 7 wherein the second coupler is connected to a fitment of a water supply hose.

9. The system of claim 8 further comprising a second wire, a second control unit and a second hub mounted to the hose proximal the second coupler.

10. A method for detecting an imminent failure or an existing failure in a rubber water supply hose to an appliance, the hose having a sidewall with an exterior surface, an internal lumen and a first coupler at one end connected to an intake of the appliance and a second coupler at an opposed end connected to a water supply valve, the method comprising:
wrapping a first conductive material about a portion of the hose proximate the first coupling or the second coupling;
establishing an electrical current through the first conductive material;
connecting the first conductive material to a first hub;
measuring the diameter of the hose at a first moment to establish an original diameter;
measuring the diameter of the hose at a second moment after a pressure cycle of the hose has occurred from the first moment to establish a current diameter;
computing the original diameter to the current diameter to define a change in diameter;
comparing the change in the diameter of the hose with a threshold value; and
transmitting an electronic signal with the hub to notify of a leak or an imminent leak in response to exceeding the threshold value.

11. The method of claim 10 wherein the hub is in electrical communication with the water supply valve, and the hub is for generating and transmitting a signal to a control associated with the water supply valve to move the valve to a shut condition.

12. The method of claim 10 wherein the hub transmits an electronic signal to report of a leak when current flow is lost through the conductive material.

13. The method of claim 10 further comprising the step of entering into the hub an electronic address to transmit the electronic signal to notify of a leak or an imminent leak.

14. The method of claim 10 further comprising the step of providing a visual or aural indication with the hub to notify of a leak or an imminent leak.

15. The method of claim 10 further comprising the step of entering a textual message into the hub to be sent with the electronic signal.

16. The method of claim 10 further comprising the step of wrapping a second conducting material about the hose and spaced from the first conducting material.

17. The method of claim 16 further comprising the step of connecting the second conducting material to a second hub.

18. The method of claim 17 wherein the first conducting material is positioned proximate the first coupler and the second conducting material positioned proximate the second coupler.

19. The method of claim 10 wherein the first hub has a Bluetooth communication protocol chip.

* * * * *